United States Patent
Koch et al.

(10) Patent No.: US 10,220,933 B2
(45) Date of Patent: Mar. 5, 2019

(54) FLIGHT DECK DOOR ASSEMBLY

(71) Applicant: AIRBUS OPERATIONS GMBH, Hamburg (DE)

(72) Inventors: Maik Koch, Hamburg (DE); Kai Bredemeier, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 229 days.

(21) Appl. No.: 15/241,978

(22) Filed: Aug. 19, 2016

(65) Prior Publication Data
US 2017/0050718 A1   Feb. 23, 2017

(30) Foreign Application Priority Data

Aug. 20, 2015  (EP) .................................. 15181845

(51) Int. Cl.
  *B64C 1/14*  (2006.01)
  *B64D 11/02*  (2006.01)
(52) U.S. Cl.
  CPC ............ *B64C 1/1469* (2013.01); *B64D 11/02* (2013.01)
(58) Field of Classification Search
  CPC .............................. B64C 1/1469; B64D 11/02
  See application file for complete search history.

(56) References Cited

U.S. PATENT DOCUMENTS

| | | | |
|---|---|---|---|
| 6,702,231 B2* | 3/2004 | Ward | B64C 1/1469 244/118.5 |
| 7,984,875 B2* | 7/2011 | Koehn | B64C 1/1469 244/118.5 |
| 8,720,827 B2* | 5/2014 | Boren | B64D 11/02 160/210 |
| 2003/0066931 A1 | 4/2003 | Ward | |
| 2009/0065641 A1 | 3/2009 | Koehn et al. | |

FOREIGN PATENT DOCUMENTS

| | | | |
|---|---|---|---|
| DE | 102 04 544 A1 | 8/2003 | |
| DE | 10 2010 032493 | 2/2012 | |
| GB | 2452841 A * | 3/2009 | ........... B64C 1/1469 |

OTHER PUBLICATIONS

European Search Report for EP 15 181845.7 dated Dec. 16, 2015.

* cited by examiner

*Primary Examiner* — Philip J Bonzell
(74) *Attorney, Agent, or Firm* — Jenkins, Wilson, Taylor & Hunt, P.A.

(57) ABSTRACT

A flight deck door assembly for an aircraft includes a flight deck bulkhead defining an access opening from a passenger deck area to a flight deck area of the aircraft, a lavatory bulkhead spaced apart from the flight deck bulkhead and defining a lavatory monument, a first lock containment arranged in a first portion of the flight deck bulkhead opposite to a door jamb formed by a second portion of the flight deck bulkhead, a second lock containment arranged in the lavatory bulkhead, and a flight deck door having a door blade hingedly coupled to the door jamb. The flight deck door is configured to latch to the first lock containment in a first closing position and to latch to the second lock containment in a second closing position.

10 Claims, 1 Drawing Sheet

FLIGHT DECK DOOR ASSEMBLY

CROSS-REFERENCE TO RELATED APPLICATION

This application claims priority to European patent application EP 15 181845.7 filed Aug. 20, 2015, the entire disclosure of which is incorporated by reference herein.

TECHNICAL FIELD

The present disclosure relates to a flight deck door assembly, specifically for variably extendable flight decks on board of an aircraft.

BACKGROUND

Flight decks in an aircraft need to be secured against access of unauthorized persons. Thus, flight deck doors of aircraft are usually reinforced to prevent or at least delay passage through the door by persons other than the flight deck crew. A cockpit door locking system (CDLS) is provided to control the closing, locking and opening of the flight deck door from the inside of the flight deck so that only flight deck personnel are able to control the opening and closing state of the door.

In some instances, specifically when the flight deck by itself does not include separate facilities that the flight deck crew needs to use at some times, such as for example a separate lavatory, a member of the flight deck crew will open the flight deck door to leave the flight deck area in order to use the lavatory provided for the remaining persons on board of the aircraft. During the leave or absence of the flight deck crew member cabin, security measures have to be put in place in order to ensure flight deck safety and protection against unwarranted intrusion into the cockpit by unauthorized persons.

Some prior art solutions aim at allowing unfettered secure access to a lavatory by the flight deck crew. Document DE 102 04 544 A1 for example discloses a revolving gate rotatably mounted in a stationary gate frame to control ingress to and egress from an access restricted compartment, such as the cockpit in an aircraft. The revolving gate is rotatable about its central longitudinal axis through angular sectors to bring the gate opening into alignment with any one opening of at least two frame openings at a time, with the status of the revolving gate being controllable from the cockpit for incapacitating any unauthorized intruder.

Document US 2009/0065641 A1 discloses a multi-position door system for an aircraft with a flight deck door hingedly coupled to a flight deck bulkhead. A lavatory is adjacent to the flight deck bulkhead and formed of a lavatory bulkhead. A lavatory door is coupled to the lavatory bulkhead. A latching mechanism is attached to the flight deck door. The latching mechanism in a first position engages the flight deck bulkhead and in a second position engages the lavatory bulkhead.

There is, however, a need for improvements in security door systems for aircraft which are easier to install and more convenient in operation.

SUMMARY

A first aspect of the disclosure herein pertains to a flight deck door assembly comprising a flight deck bulkhead defining an access opening from a passenger deck area to a flight deck area of the aircraft, a lavatory bulkhead spaced apart from the flight deck bulkhead and defining a lavatory monument, a first lock containment arranged in a first portion of the flight deck bulkhead opposite to a door jamb formed by a second portion of the flight deck bulkhead, a second lock containment arranged in the lavatory bulkhead, and a flight deck door having a door blade hingedly coupled to the door jamb. The flight deck door is configured to latch to the first lock containment in a first closing position and to latch to the second lock containment in a second closing position.

According to a second aspect of the disclosure, an aircraft comprises a flight deck door assembly according to the first aspect of the disclosure.

One of the ideas on which the present disclosure is based is to provide an additional secured locking position for a flight deck door so that the effective flight deck area may be variably and temporarily extended to include an access space to a lavatory monument next to the flight deck. This additional locking position can be implemented by latching the flight deck door in a different angle to selectively provide access to the lavatory monument from different sides of the flight deck door. The lavatory monument may thus be selectively included in the restricted flight deck area for use by the flight deck crew or in the passenger deck area for generally unrestricted use by any flight passenger.

According to an embodiment of the flight deck door assembly, a door blade extension may be slidably attached to the door blade and configured to extend the width of the door blade in an extended position. An important aspect of this embodiment is the variability in effective door width of the flight deck door. By providing a variably extendable door blade, the lock containments may advantageously not need to be exposed to the bulkheads making up the lavatory monument. Therefore, the design constraints for the flight deck door assembly are made more flexible due to the flexibility in door blade extension.

According to another embodiment of the flight deck door assembly, the lavatory monument may comprise sanitary equipment, such as for example a toilet and/or a sink.

According to another embodiment of the flight deck door assembly, the lavatory monument may further comprise a lavatory door configured to shut a lavatory access opening between the first lock containment and the second lock containment. With the lavatory door the lavatory monument itself may be shut in any of the locking positions of the flight deck door.

According to another embodiment of the flight deck door assembly, the flight deck door assembly may further comprise a flight deck door control system comprising a first flight deck door control panel accessible from the flight deck area and a second flight deck door control panel accessible from within the lavatory monument. The flight deck door control system may only provide control over the locking or opening state of the door to authorized flight crew personnel, such as the pilot, the co-pilot and/or flight stewards.

In one embodiment, the flight deck door control system may be configured to unlock the flight deck door in its first closing position via the first flight deck door control panel only and to unlock the flight deck door in its second closing position via the second flight deck door control panel only. That way, it may be ensured that any flight crew member using the lavatory may not be locked out of the flight deck area from within the flight deck. On the other hand, the second flight deck door control panel is disabled as long as the lavatory is used by passengers or any other unauthorized persons not belonging to the flight deck crew.

According to another embodiment of the flight deck door assembly, the door blade extension may be configured to be extended in the first closing position of the flight deck door. This allows the first lock containment to be embedded within the flight deck bulkhead since movement past the first lock containment may be realized by retracting the door blade extension to shorten the width of the door blade of the flight deck door.

According to a further embodiment of the flight deck door assembly, the door blade extension may configured to be retracted within the door blade when the flight deck door is moved from the first closing position to the second closing position and vice versa. Retracting the door blade extension during movement along the access opening of the lavatory monument provides for more leeway in designing the lavatory door and for more effective space within the lavatory monument.

According to a further embodiment of the flight deck door assembly, the flight deck door may be configured to be opened into an opening position with the door blade extending into the flight deck area. Such a configuration with the flight deck door opening inwards into the cockpit is advantageous for safety reasons: In case of rapid decompression in the flight deck area, i.e. a rapid decrease of pressure in comparison to the pressure in the passenger deck area, the flight deck door will open more easily and more rapidly due to the pressure difference between passenger cabin and cockpit. Thus, the required time for opening the flight deck door and, hence, removing the barrier between flight deck area and passenger deck area to equalize the pressure differences is advantageously decreased. Moreover, any major damages to the fuselage and/or the flight deck door assembly may be prevented.

BRIEF DESCRIPTION OF THE DRAWINGS

The disclosure herein will be explained in greater detail with reference to exemplary embodiments depicted in the drawings as appended.

The accompanying drawings are included to provide a further understanding of the present disclosure and are incorporated in and constitute a part of this specification. The drawings illustrate the embodiments of the present disclosure and together with the description serve to explain the principles of the disclosure herein. Other embodiments of the present disclosure and many of the intended advantages of the present disclosure will be readily appreciated as they become better understood by reference to the following detailed description. The elements of the drawings are not necessarily to scale relative to each other. Like reference numerals designate corresponding similar parts.

DETAILED DESCRIPTION

Figure 1:
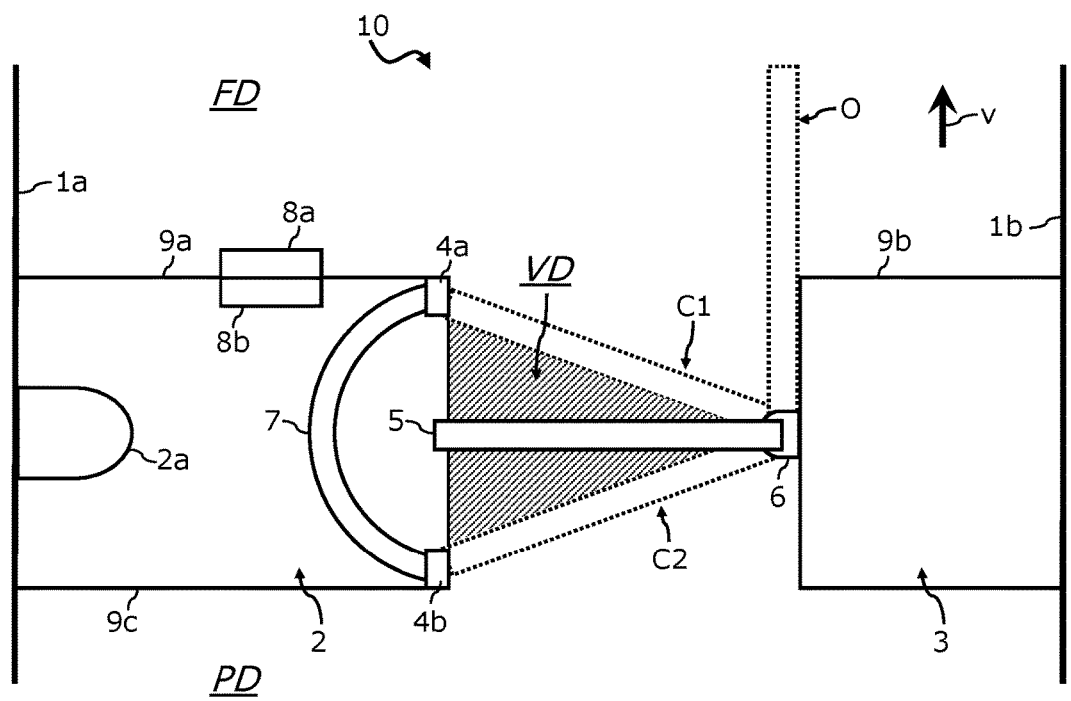
FIG. 1 schematically illustrates a flight deck door assembly according to an embodiment of the disclosure herein.

In the figures, like reference numerals denote like or functionally like components, unless indicated otherwise. Any directional terminology like "top", "bottom", "left", "right", "above", "below", "horizontal", "vertical", "back", "front", and similar terms are merely used for explanatory purposes and are not intended to delimit the embodiments to the specific arrangements as shown in the drawings.

Although specific embodiments have been illustrated and described herein, it will be appreciated by those of ordinary skill in the art that a variety of alternate and/or equivalent implementations may be substituted for the specific embodiments shown and described without departing from the scope of the present disclosure. Generally, this application is intended to cover any adaptations or variations of the specific embodiments discussed herein.

Figure 3:
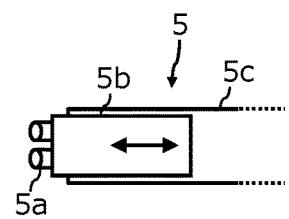
FIG. 3 schematically illustrates a second extension state of a flight deck door according to another embodiment of the disclosure herein.
Figure 4:
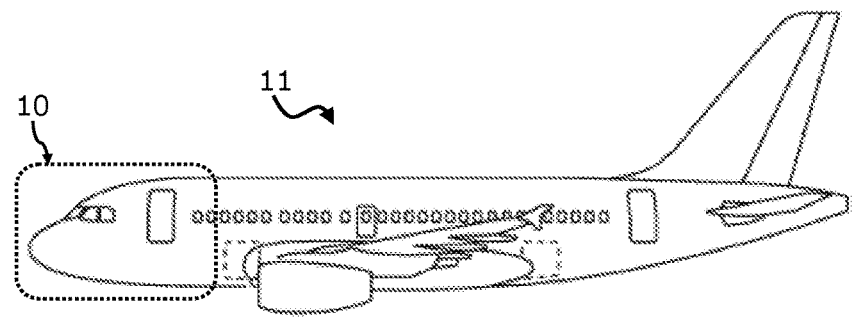
FIG. 4 schematically illustrates an aircraft having a flight deck door assembly according to another embodiment of the disclosure herein.

FIG. 1 shows a schematic illustration of a flight deck door assembly 10 as it may be employed in the fore or front of an aircraft, particularly a passenger aircraft. FIG. 4 exemplarily depicts an aircraft 11 comprising such a flight deck door assembly 10 as explained and described in conjunction with FIGS. 1 to 3.

The flight deck door assembly 10 is generally located in the front of an aircraft and separates a flight deck area FD from a passenger deck area PD in the aircraft. The flight deck area FD may be enclosed by left and right fuselage walls 1a and 1b of the fuselage of the aircraft on one hand and by the flight deck door assembly 10 on the other hand. When seen in flight direction of the aircraft (schematically indicated as arrow "v" in FIG. 1), the flight deck area is located in front of the passenger deck area PD. The passenger deck area PD may include entrance aisles, galley aisles and the passenger seating areas.

The flight deck area FD is separated from the passenger deck area PD via a flight deck bulkhead 9a, 9b. The flight deck bulkhead generally includes two flight deck bulkhead portions 9a and 9b which define an access opening from the passenger deck area PD to the flight deck area FD of the aircraft. A lavatory bulkhead 9c is spaced apart from the flight deck bulkhead 9a, thereby defining a lavatory monument 2. The lavatory monument 2 may for example comprise sanitary equipment 2a, such as for example a toilet and/or a sink.

Opposite to the lavatory monument 2, i.e. on the other side of the access opening, another cabin monument 3, such as for example another lavatory, a galley, a storage facility or similar monument types, may be installed with the flight deck bulkhead portion 9b as rear wall and other (not explicitly referenced) side walls. At one of the side walls of the cabin monument 3, a door jamb 6 may be formed with a hinge. The door jamb 6 is hingedly coupled to a flight deck door 5. The flight deck door 5 may be revolved around the door jamb 6 into different closing and/or opening positions. Generally, the flight deck door 5 may be approximately dimensioned to shut the access opening in the flight deck bulkhead. For example, the flight deck door 5 may be brought into an opening position O where the blade of the flight deck door 5 is angled approximately 90° about the hinge at the door jamb 6. In this state, access to the flight deck area FD from the passenger deck area PD is not blocked.

The opening position O of the flight deck door 5 may be specifically implemented with the door blade extending into the flight deck area FD, as opposed to an opening position where the door blade extends into the passenger deck area PD. Such an opening position O can be reached more easily when rapid decompression in the flight deck area FD occurs. For safety reasons, decompression in the cockpit may need to be combatted or addressed faster and more reliably than decompression in the passenger cabin. The mechanical design of the flight deck door 5 completely opening towards the cockpit rather than towards the passenger cabin mitigates a lot of safety risks in case of decompression within the aircraft.

The flight deck door 5 may additionally assume at least two different closing positions C1 and C2 in which access to the flight deck area FD from the passenger deck area PD is blocked. To that end, the flight deck door assembly includes two lock containments 4a and 4b installed in the lavatory monument 2. A first lock containment 4a is arranged in a first portion of the flight deck bulkhead 9a opposite to the door jamb 6. A second lock containment 4b is arranged in the lavatory bulkhead 9c. The lock containments 4a and 4b may each comprise strike plates or bolt locking plates to which corresponding locking pins, latches or bolts of the locking mechanism of the flight deck door may latch to. The flight deck door 5 is specifically configured to latch to the first lock containment 4a in a first closing position C1 and to latch to the second lock containment 4b in a second closing position C2.

In the first closing position C1, the access space in front of the flight deck door 5 (denoted as variable deck area VD) belongs to the passenger deck area PD, so that passengers from the passenger deck area PD may have generally unrestricted access to the lavatory monument 2. In the second closing position C2, however, the access space in front of the flight deck door 5 belongs to the flight deck area FD, so that passengers from the passenger deck area PD may not enter the lavatory monument 2 due to the flight deck door 5 blocking the access. In that state, the flight deck area FD is temporarily extended to include the lavatory monument 2 in the access restricted area so that the flight deck crew members may use the lavatory without having to actually leave the safety of the flight deck area FD.

The lavatory monument 2 comprises a lavatory door 7, for example a folding door or an articulated panel door that is configured to shut a lavatory access opening between the first lock containment 4a and the second lock containment 4b. The lock containments 4a and 4b may to this end additionally include latching devices and hinges to hold the lavatory door 7 in place. The lavatory door 7 may be operated independently of the flight deck door 5 to ensure privacy of a person using the lavatory.

In order to operate the flight deck door 5, the flight deck door assembly may further comprise a flight deck door control system that may be restricted in use for authorized personnel only, such as select members of the flight deck crew. A first flight deck door control panel 8a may be installed in the flight deck area FD, for example in the cockpit of the aircraft, so that it is only accessible from the flight deck area FD. A second flight deck door control panel 8b may be installed within the lavatory monument 2 and may only be accessible from within the lavatory monument 2.

The flight deck door control system may be configured to unlock the flight deck door 5 in its first closing position C1 via the first flight deck door control panel 8a only, i.e. the flight deck area FD may only be made accessible from inside the flight deck area FD by authorized personnel such as the flight captain or the co-pilot.

When a member of the flight deck crew is using the lavatory and the flight deck door 5 is locked in its second closing position C2, the first flight deck door control panel 8a may be temporarily deactivated and the flight deck door 5 may only be unlocked via operation of the second flight deck door control panel 8b. This means, that an accidental or purposeful lockout of the member of the flight deck crew within the lavatory monument by another flight deck crew member in the cockpit is not possible.

The lavatory monument 2 may further comprise suitable occupancy monitoring systems that ensure that no one is inside the lavatory monument 2 before the flight deck door 5 is moved from the first closing position C1 to the second closing position C2 and vice versa.

Since the space for rotating the door blade of the flight deck door 5 is limited, the flight deck door 5 may be variably extended in width. Different extension states of the flight deck door 5 are exemplarily shown in conjunction with FIGS. 2 and 3.

Figure 2:
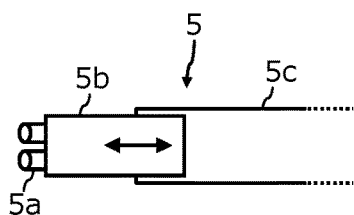
FIG. 2 schematically illustrates a first extension state of a flight deck door according to a further embodiment of the disclosure herein.

The flight deck door 5 comprises a door blade 5c which may have a door blade extension 5b slidably attached to the door blade 5c. The door blade extension 5b may be configured to extend the width of the door blade 5c in an extended position. Such a position is shown in FIG. 2 where the door blade extension 5b protrudes from the far end of the door blade 5c, i.e. the end of the door blade 5c opposite to the door jamb 6. The door blade extension 5b may for example be retractable within a hollow space of the door blade 5c by rollers, springs, articulated limbs or similar devices.

The door blade extension 5b may be extended in the first closing position C1 of the flight deck door 5, so that the locking mechanism of the lock containment 4a and locking counterparts of the flight deck door (exemplarily illustrated as locking pins 5a in FIGS. 2 and 3) may latch firmly and completely shut off the flight deck area FD. In order to move the flight deck door 5 from the first closing position C1 to another position, for example an opening position or the second closing position C2, the door blade extension 5b may be retracted within the door blade 5. This shortens the width of the door blade 5c and renders it spatially possible to move the door blade 5c past the lock containment 4a, for example from the second closing position C2 to the opening position O.

This is advantageous since the lock containment 4a does not need to protrude from the flight deck bulkhead portion 9a and may be conveniently and mechanically stably installed within the flight deck bulkhead portion 9a. Another advantage of the variable width of the door blade 5c is that when the flight deck door is moving between the closing positions C1 and C2 in a sweeping, the angular sector swept over by the door blade 5c has smaller overlap with the inside of the lavatory monument 2. In this manner, the freedom in design of the lavatory door 7 is enhanced since there is no spatial interference between the opening zones of the lavatory door and the flight deck door 5.

In the foregoing detailed description, various features are grouped together in one or more examples or examples with the purpose of streamlining the disclosure. It is to be understood that the above description is intended to be illustrative, and not restrictive. It is intended to cover all alternatives, modifications and equivalents. Many other examples will be apparent to one skilled in the art upon reviewing the above specification.

The embodiments were chosen and described in order to best explain the principles of the disclosure herein and its practical applications, to thereby enable others skilled in the art to best utilize the disclosure herein and various embodiments with various modifications as are suited to the particular use contemplated. In the appended claims and throughout the specification, the terms "including" and "in which" are used as the plain-English equivalents of the respective terms "comprising" and "wherein," respectively.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a", an or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

What is claimed is:

1. A flight deck door assembly for an aircraft, comprising:
   a flight deck bulkhead defining an access opening from a passenger deck area to a flight deck area of the aircraft;
   a lavatory bulkhead spaced apart from the flight deck bulkhead and defining a lavatory monument;
   a first lock containment arranged in a first portion of the flight deck bulkhead opposite to a door jamb formed by a second portion of the flight deck bulkhead;
   a second lock containment arranged in the lavatory bulkhead; and
   a flight deck door having a door blade hingedly coupled to the door jamb,
   wherein the flight deck door is configured to latch to the first lock containment in a first closing position and to latch to the second lock containment in a second closing position, and
   wherein the flight deck door is configured to be opened into an opening position with the door blade extending into the flight deck area.

2. The flight deck door assembly of claim 1, wherein the lavatory monument comprises sanitary equipment.

3. The flight deck door assembly of claim 1, wherein the lavatory monument further comprises a lavatory door configured to shut a lavatory access opening between the first lock containment and the second lock containment.

4. The flight deck door assembly of claim 1, wherein a door blade extension is slidably attached to the door blade and configured to extend the width of the door blade in an extended position.

5. The flight deck door assembly of claim 4, wherein the door blade extension is configured to be extended in the first closing position of the flight deck door.

6. The flight deck door assembly of claim 4, wherein the door blade extension is configured to be retracted within the door blade when the flight deck door is moved from the first closing position to the second closing position and vice versa.

7. The flight deck door assembly of claim 1, further comprising:
   a flight deck door control system comprising a first flight deck door control panel accessible from the flight deck area and a second flight deck door control panel accessible from within the lavatory monument.

8. The flight deck door assembly of claim 7, wherein the flight deck door control system is configured to unlock the flight deck door in its first closing position via the first flight deck door control panel only and to unlock the flight deck door in its second closing position via the second flight deck door control panel only.

9. An aircraft comprising a flight deck door assembly, the flight deck door assembly comprising:
   a flight deck bulkhead defining an access opening from a passenger deck area to a flight deck area of the aircraft;
   a lavatory bulkhead spaced apart from the flight deck bulkhead and defining a lavatory monument;
   a first lock containment arranged in a first portion of the flight deck bulkhead opposite to a door jamb formed by a second portion of the flight deck bulkhead;
   a second lock containment arranged in the lavatory bulkhead; and
   a flight deck door having a door blade hingedly coupled to the door jamb,
   wherein the flight deck door is configured to latch to the first lock containment in a first closing position and to latch to the second lock containment in a second closing position, and
   wherein the flight deck door is configured to be opened into an opening position with the door blade extending into the flight deck area.

10. The flight deck door assembly of claim 1, wherein, when the flight deck door is in the opening position extending in the flight deck area, the door blade is angled approximately 90° about a hinge of the door jamb.

* * * * *